(12) United States Patent
Inotay et al.

(10) Patent No.: US 10,504,110 B2
(45) Date of Patent: Dec. 10, 2019

(54) APPLICATION SYSTEM FOR MOBILE PAYMENT AND METHOD FOR PROVIDING AND USING MOBILE MEANS FOR PAYMENT

(71) Applicant: CELLUM GLOBAL INNOVÁCIÓS ÉS SZOLGÁLTATÓ ZRT., Siófok (HU)

(72) Inventors: Balázs Inotay, Budaörs (HU); Zoltán Ács, Érd (HU); Balázs Dobos, Budapest (HU)

(73) Assignee: CELLUM GLOBAL INNOVÁCIÓS ÉS SZOLGÁLTATÓ ZRT, Siofok (HU)

( * ) Notice: Subject to any disclaimer, the term of this patent is extended or adjusted under 35 U.S.C. 154(b) by 1084 days.

(21) Appl. No.: 14/427,315

(22) PCT Filed: Sep. 10, 2013

(86) PCT No.: PCT/HU2013/000089
§ 371 (c)(1),
(2) Date: Mar. 11, 2015

(87) PCT Pub. No.: WO2014/041381
PCT Pub. Date: Mar. 20, 2014

(65) Prior Publication Data
US 2015/0227916 A1    Aug. 13, 2015

(30) Foreign Application Priority Data

Sep. 12, 2012    (HU) ...................................... 1200524

(51) Int. Cl.
*G06Q 20/12*    (2012.01)
*G06Q 20/38*    (2012.01)
(Continued)

(52) U.S. Cl.
CPC ......... *G06Q 20/3823* (2013.01); *G06Q 20/12* (2013.01); *G06Q 20/322* (2013.01);
(Continued)

(58) Field of Classification Search
None
See application file for complete search history.

(56) References Cited

U.S. PATENT DOCUMENTS 6,370,649 B1    4/2002 Angelo et al.
2002/0023215 A1    2/2002 Wang et al.
(Continued)

FOREIGN PATENT DOCUMENTS

CN    102254264 A    11/2011
EP    1 221 669 A1    7/2002
(Continued)

OTHER PUBLICATIONS

International Search Report, dated Mar. 27, 2014, issued in PCT/HU2013/000089.
(Continued)

*Primary Examiner* — Steven S Kim
*Assistant Examiner* — Jason B Fenstermacher
(74) *Attorney, Agent, or Firm* — Foley & Lardner LLP

(57) ABSTRACT

Application system for mobile means of payment comprising mobile devices. A service provider, an account manager, a balance manager and a mobile POS terminal for executing a payment transaction initiated by a merchant and receiving the result of it. It comprises: —a communications server (3) adapted to generate a token for authorizing a transaction initiated by a user; —a safety server (4) adapted to authenticate the user by signing an imprint with the unique private key of the user and using the PIN code of the user, when a message encrypted with the public key of the safety server (4) containing the imprint generated from the data of a
(Continued)

Figure 1:
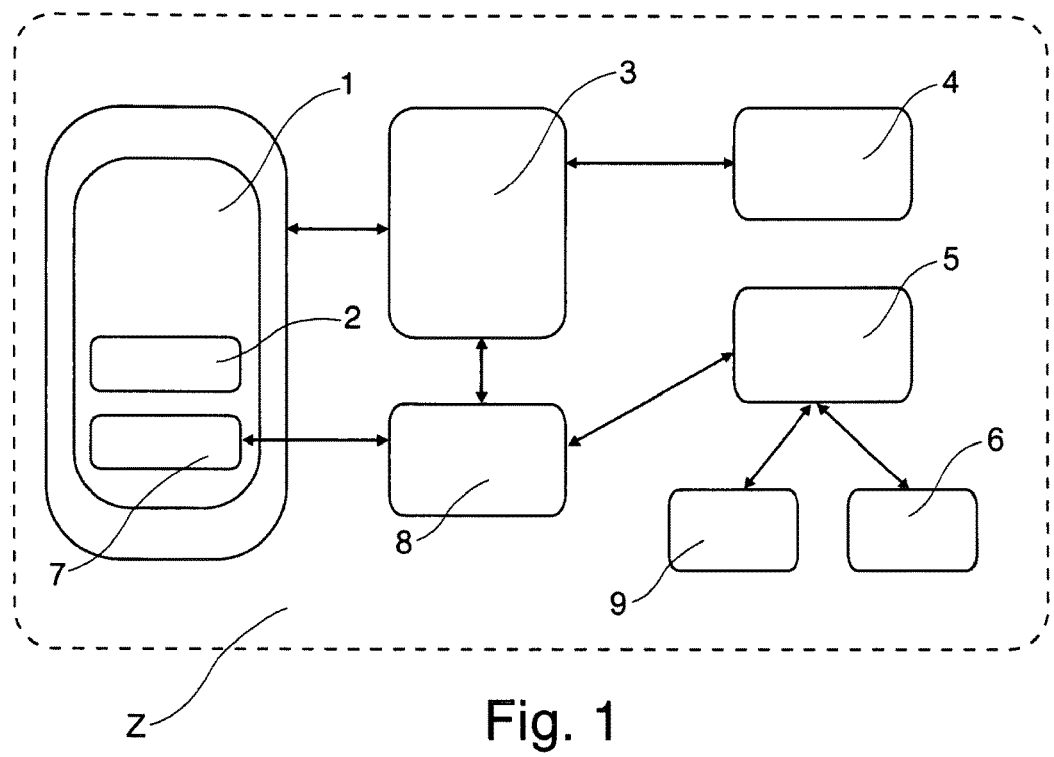

transaction initiated by the user on the mobile device (1) is received; —an execution server (5) adapted to unpack a message on the basis of authentication and signature verification, for generating and transmitting data to a balance manager to execute a transaction, as well as for transmitting the result of the balance manager's transaction in an authentic manner; —an UMG server (8) adapted to convert the payment transactions initiated by the user into service provider transaction and to transmit it to the service provider; —a mobile POS terminal; —a merchant terminal server (9) adapted to convert the initiated transaction into merchant transaction and to transmit it to the service provider; the server (4) via said communications server (3), said communications server (3) via said execution server (5) and said UMG server (8), said execution server (5) via said integrated merchant interface (6), said terminal server (9) and said UMG server (8) are connected to said mobile POS terminal through a respective safe channel.

4 Claims, 3 Drawing Sheets

(51) Int. Cl.
*G06Q 20/32* (2012.01)
*G06Q 20/40* (2012.01)

(52) U.S. Cl.
CPC ..... *G06Q 20/3226* (2013.01); *G06Q 20/3825* (2013.01); *G06Q 20/3829* (2013.01); *G06Q 20/38215* (2013.01); *G06Q 20/4012* (2013.01)

(56) References Cited

U.S. PATENT DOCUMENTS

| | | | |
|---|---|---|---|
| 2004/0254954 A1* | 12/2004 | Gatto | G06Q 20/18 |
| 2007/0069852 A1 | 3/2007 | Mo et al. | |
| 2008/0181408 A1* | 7/2008 | Hird | G06F 21/62 380/277 |
| 2009/0254996 A1* | 10/2009 | Conus | H04N 7/163 726/27 |
| 2011/0258452 A1* | 10/2011 | Coulier | G06F 21/31 713/171 |
| 2012/0185398 A1* | 7/2012 | Weis | G06Q 20/20 705/75 |
| 2013/0095754 A1* | 4/2013 | Moreton | G06Q 20/3226 455/41.1 |

FOREIGN PATENT DOCUMENTS

| | | |
|---|---|---|
| WO | WO 00/54457 A1 | 9/2000 |
| WO | WO 2011/032263 A1 | 3/2011 |

OTHER PUBLICATIONS

Summons to attend oral proceedings to Rule 115(1) EPC for EP Application No. 13779905.2 dated Apr. 18, 2018.

\* cited by examiner

APPLICATION SYSTEM FOR MOBILE PAYMENT AND METHOD FOR PROVIDING AND USING MOBILE MEANS FOR PAYMENT

The subject matter of the invention is paying for goods or services via mobile means of payment. More specifically the invention relates to an application system for mobile payment. The system comprises mobile devices of registered users provided with applications and operated in a mobile network—e.g. GSM/CDMA network—, service provider, account manager, balance manager and a mobile POS terminal executing a payment operation initiated by a service provider and receiving the result of it. The invention further relates to a method for providing mobile means of payment and a method for using it in the application system for mobile payment.

Hereinafter the term merchant may refer to any service providers having a suitable apparatus.

Patent application HU 224788 discloses a solution for payment transactions in a simple manner via a mobile phone. However, capabilities of mobile devices, such as mobile phones have been improved significantly. At the same time safe and reliable transmission is required in order to prevent the system from being hacked.

The aim of the present invention is to improve the solutions disclosed in HU 224788 as well as to store and handle data featuring the mobile means of payment in a safe manner.

The basic idea of the present invention is to provide a safe method for storing data featuring the mobile means of payment through which paying for goods and services via a mobile phone can be performed differently from the known solutions.

It has been realized that storing data on mobile phones is unsafe as these data can be acquired and modified. To solve this problem the known solutions for storing payment on mobile phones use a safe storage a so called Secure Element. Usually, such safe storage is realized on a SIM or UICC, on an SD card or by means of an SE circuit installed in the phone during manufacture.

The present invention does not use safe storage—Secure Element—in the phone. Instead, the information relating to the means of payment is converted into a cryptogram which is then divided into two. The first part of the cryptogram is stored in the mobile phone in an unsafe environment, while the other part is stored at an execution server in a safe environment protected by Hardware Security Module.

Further, it has been realized that information originated from a mobile phone cannot be considered authentic since other devices can function as a phone. The solutions which support the authentication of the user in a mobile phone environment also require safe key storage and safe signature means (means for executing cryptographic operations) in the mobile phone. Such signature encrypting means also may be realized on a SIM or UICC, on an SD card or by means of an SE circuit installed in the phone during manufacture.

The present invention does not use safe signature means and key storage in the mobile phone. According to the present invention the transaction is generated on the mobile phone, but only the imprint of it must be signed. Signing of the imprint is executed by means of the Hardware Security Module at the safety server, verification of the signature is executed on the mobile phone and finally at the execution server.

The signature server checks and performs a double validity check relating to the identity and authenticity of the person initiating the signing. To initiate the signature of a transaction the user must possess the phone and must know and transmit the signature enabling password to the signature server. These information exchanges are protected and encrypted by means of single-use session keys. These keys can be obtained only by the application executed on the mobile device.

Finally, every transaction is signed digitally with a private key assigned to the user and encrypted with the public key of the execution server for transmission from the phone to the execution server. In this manner authenticity, confidentiality and integrity of the transaction is ensured. To implement the method dedicated system architecture is provided.

In one aspect the invention is an application system for mobile payment as disclosed in the preamble which further comprises:

a communications server adapted to generate a token for authorizing a transaction initiated by a user;

a safety server adapted to authenticate the user by signing an imprint with the unique private key of the user and using the PIN code of the user, when a message encrypted with the public key of the safety server containing the imprint generated from the data of a transaction initiated by the user on the mobile device is received;

an execution server adapted to unpack a message on the basis of authentication and signature verification, to generate and transmit data to a balance manager to execute an operation, as well as to transmit the result of the balance manager's operation in an authentic manner;

an UMG server adapted to convert the payment transactions initiated by the user into service provider transaction and to transmit it to the service provider;

a mobile POS terminal;

a merchant terminal server adapted to convert the initiated transaction into merchant transaction and to transmit it to the service provider;

where in the safety server via the communications server, the communications server via the execution server and the UMG server, the execution server via the integrated merchant interface and the terminal server and the UMG server are connected to the mobile POS terminal through a respective safe channel.

In another aspect the invention is a method for providing mobile means of payment in the aforementioned system. During the method the following steps are taken:

a) installing a dedicated mobile application in the mobile device, b) providing data of means of payment on the mobile application interface, c) encrypting the data of the means of payment and transmitting them to an execution server, in the execution server:

d) decrypting and checking the data of means of payment, e) transmitting the registration claim to a balance manager, in the balance manager:

f) executing authorization of means of payment during which a validating password in the debit is also transmitted to the balance manager, in the execution server:

g) encrypting the means of payment and dividing the obtained cryptogram into two parts, h) transmitting the first part to the mobile device and transmitting the second part to the execution server, in the mobile device of the user:

i) providing the validating password received in the debit report of the balance manager, j) encrypting the validating password and signing it if required, the password is checked and validated in the execution server, finally k) presenting the valid mobile means of payment on the mobile device.

In a third aspect the invention is a method for using mobile means of payment in the above system, during the method a debit transaction is initiated at the merchant; then in the mobile device of a user:

a) selecting a mobile means of payment for use in the transaction, b) entering the mobile PIN code belonging to the user, c) by means of a safety server the data are signed with the private key of the user and encrypted with the public key of the execution server then transmitted to the execution server, at the execution server:

d) decrypting data and verifying the authenticity of the signature, e) transmitting the transaction to be performed to the balance manager of the application system for mobile payment, in the balance manager:

f) managing the current transaction, g) the result of the current transaction is reported to the execution server, by means of the execution server the received result of the current transaction is transmitted to the merchant and the mobile device of the user, finally h) presenting the result of the transaction to the merchant and the mobile device of the user.

Generating and handling of the mobile means of payment (known as MPI in the field of mobile services) according to the invention is extremely safe in terms of storing, obtaining and restoring of data.

Figure 2:
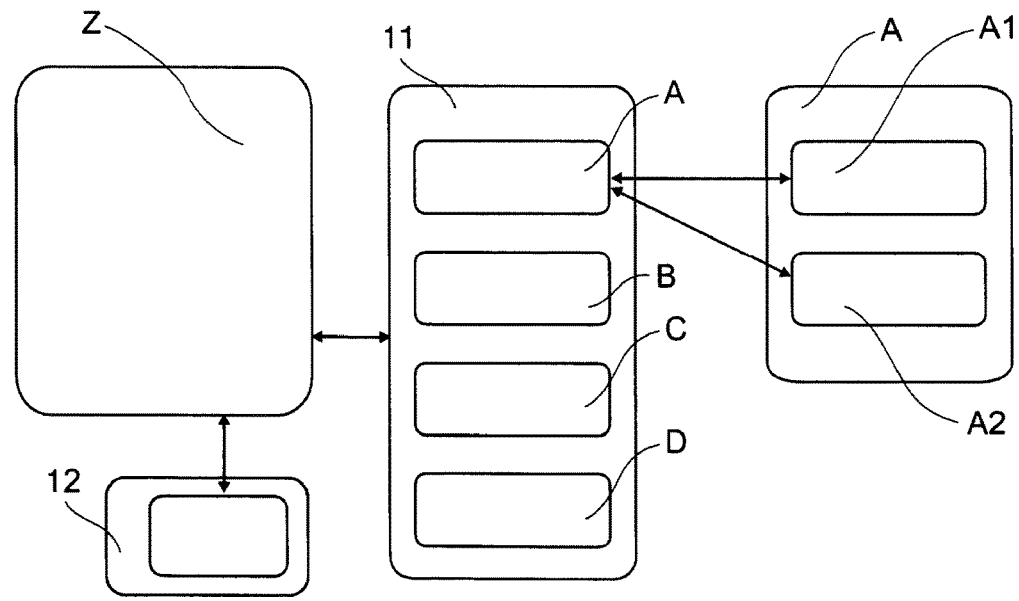
Figure 3:
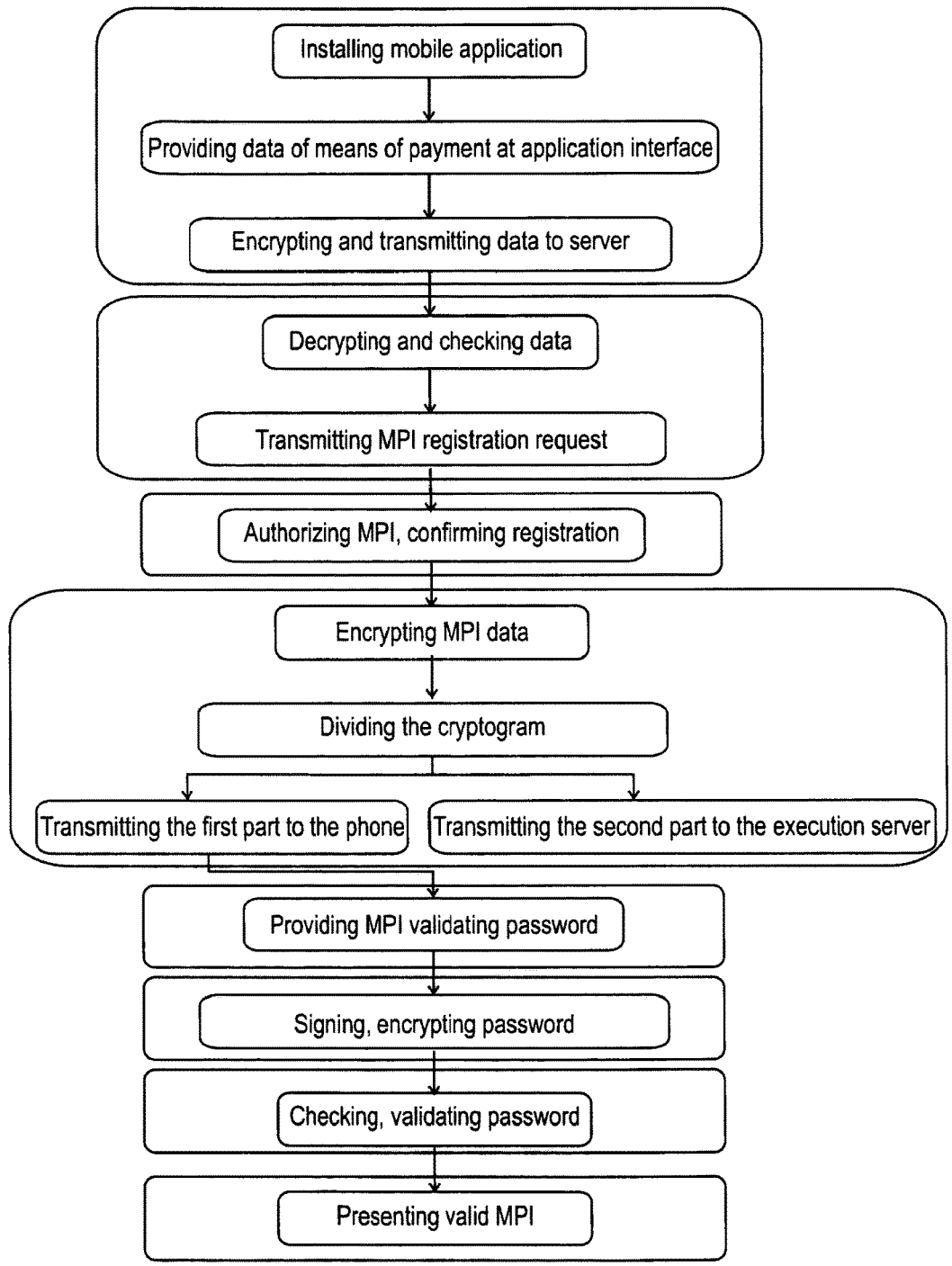
Figure 4:
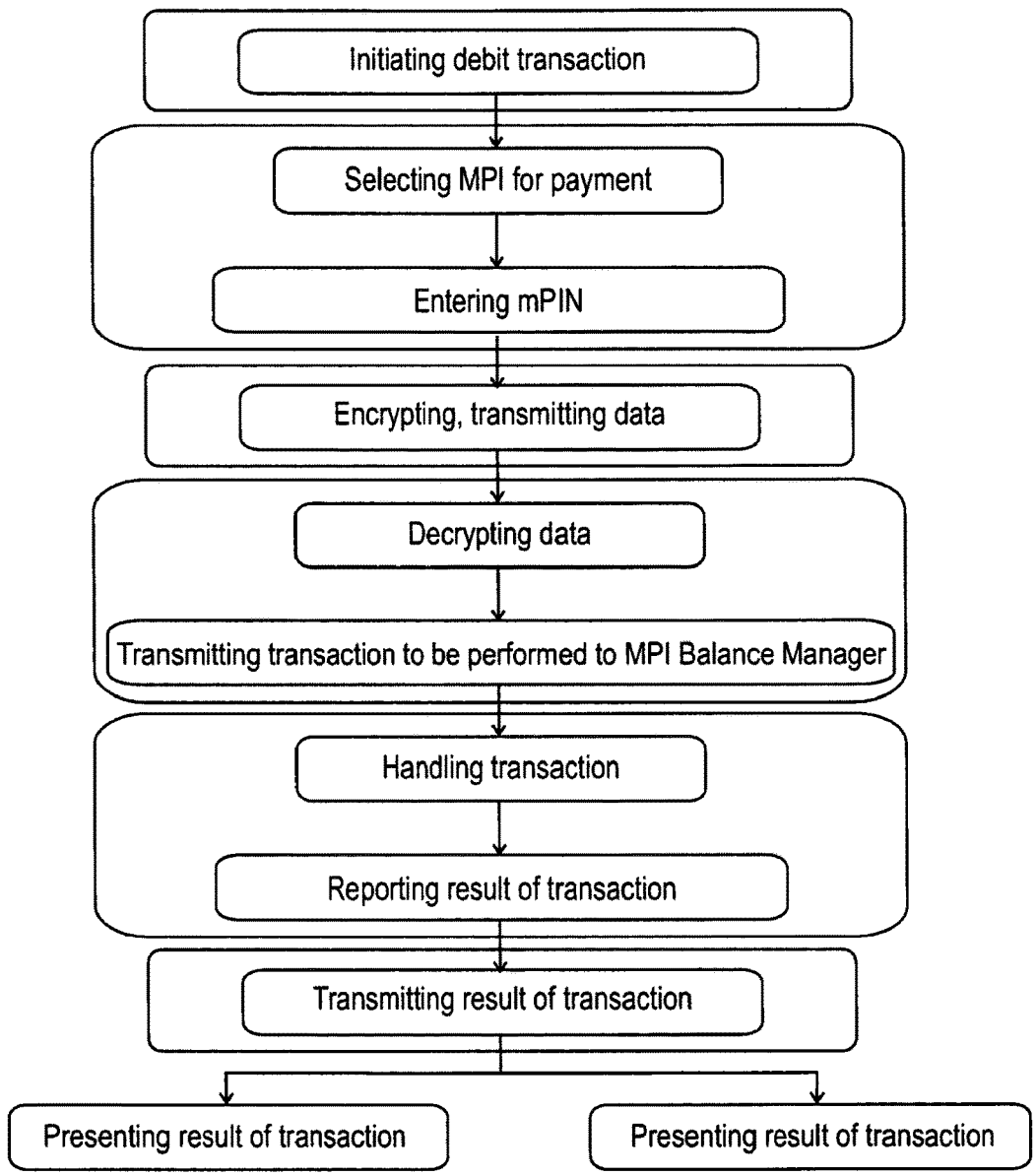

Aspects of the invention will be described with reference to the accompanying drawings in which:

FIG. 1 is a block diagram of the application system comprising the entity of the mobile means of payment which is further connected to the balance manager, FIG. 2 is a block diagram showing the connections for cooperation between the component parts of the system architecture, FIG. 3 is a flow chart showing the steps of generating the mobile means of payment, and FIG. 4 is a flow chart showing the steps of a paying transaction.

FIG. 1 shows the structure of the mobile means of payment as entity Z connected to a balance manager within an application system. FIG. 2 shows the cooperative connections between entity Z and the component parts of the system architecture, that is, cooperation with one or more balance manager 11 and a merchant 12. Via the mobile means of payment specific balance managing transactions can be performed and an authenticated notification about the results of the transactions initiated by using the mobile means of payment can be sent to the parties participating in the transaction. The mobile means of payment has type characteristics which are determined by the balance manager 11 connected thereto. The balance manager may be of different types, in the example of FIG. 2 balance manager subunits A, B, C and D may handle balances belonging to bank cards and bank accounts, loyalty points, discounts, pre-filled accounts or accounts for subsequent settlements. In the example shown balance manager subunit A handles the balance belonging to the mobile means of payment A1 and also the balance belonging to credit A2.

The life cycle of a mobile means of payment starts with the registration of the mobile means of payment. With this registration the mobile means of payment itself is accomplished which guarantees that the mobile application 2 (which registered the mobile means of payment) and the mobile device 1 (telephone or SIM card) is owned by a certain user, and the person owning mobile device 1 and being aware of the password (mobile PIN code) is authorized to perform transactions associated with balance manager 11.

Registration of the mobile means of payment may be initiated by a user, or on the basis of authorization of the user, by another person being responsible for the balance manager 11. As a result of a successful registration process a valid mobile means of payment is provided.

After successful registration of the mobile means of payment which will be described later, transactions associated with the balance manager can be performed. In case of debit transaction the party receiving the credit (e.g. merchant 12) decides which type of balance manager 11 is accepted as means of payment.

The life cycle of the mobile means of payment ends when a delete mobile means of payment operation is performed. After that the mobile means of payment cannot be reconstructed and it cannot be used for any kind of transaction. A delete command may be given by the user (the owner of the means of payment) or on the basis of authorization of the user, by another person being responsible for the balance manager 11.

The maximal period of validity for the mobile means of payment is defined by cryptographic solutions used for handling the mobile means of payment. Validity of the mobile means of payment may be determined by the balance manager or by a person responsible for the balance manager. A mobile means of payment which is no longer valid cannot be used for transactions.

A mobile means of payment transaction may be initiated in the mobile device 1 while the transaction is executed remotely, through an interface of balance manager 11 connected to an execution server 5.

Registration of the mobile means of payment, the safety measures taken during paying with the mobile means of payment as well as the cryptographic solution guarantee that the originator of the transaction, the content of the transaction and the time of the transaction are identified through the verified, joint presence of the owner of the device and the knowledge of the password. The transaction is undeniable, unchangeable from its start to its accomplishment as it is signed with the private key of the user and encrypted with the public key of the execution server. Further, the same transaction is irreproducible.

The architecture for producing a mobile means of payment according to the invention comprises the following component parts: mobile device 1 e.g. mobile phone, a mobile application 2, a communications server 3, a safety server 4 and an execution server 5. The tasks of the individual component parts are as follows:

Mobile device 1, typically a mobile phone, executes mobile application 2, provides user interface for mobile application 2, provides uniqueness of the mobile device 1, and provides output and input message channels of mobile application 2 towards communications server 3.

Mobile application 2 performs transactions, handles user output and input, executes cryptographic algorithms which ensure the integrity and confidentiality of the transaction, and communicates with the safety server 4 and execution server 5 through communications server 3.

The transaction may be initiated by the client using a mobile application function, or by means of a QR code. The QR code is a 2D code containing data which can be decrypted quickly by means of a QR code-reading application running on the mobile device. Then data contained in the code can be displayed on the screen of the device. Since there are various types of data and not every QR code contains all types of data, there are several kinds of QR codes exist as a function of the data types stored in the code.

The QR code is released by the party receiving the credit (merchant) and this party will determine the data to be contained in a particular QR code according to the data types storable by him. To generate the code a QR code an application generating QR codes is available. By filling the data in and the application, the application will generate the QR code itself.

The task of communications server 3 is to assign the mobile application 2 to mobile device 1 during registration, as well as to ensure communication between the mobile device 1 (mobile phone) and the other elements of the system during transactions. Through the assignment between the application and the mobile device 1 and examination of the same possessing of the device can be controlled during transactions. Communications server 3 provides a unique token for every single application so the system can check whether the message is sent from a registered mobile device.

Safety server 4 identifies and authenticates the originator of the transaction by checking the possessing of the device and a special password. Possessing of the device is understood as possessing the telephone or other mobile device 1 together with the mobile application 2 registered with it, while the knowledge of the password means the knowledge of a mobile PIN code. To this an imprint is generated in the mobile phone from the data of the transaction initiated by the user, then this imprint is encrypted with the public key of the safety server 4 and transmitted to safety server 4. Here the imprint is signed with the unique private key of the user. The private keys are stored encrypted in the database of safety server 4. The imprint is signed if the mobile application 2 is assigned to mobile device 1 initiating the signing and the PIN is correct. Then safety server 4 sends the signed imprint back to mobile device 1. Mobile application 2 checks the signed imprint on the basis of data of the transaction and the public key of the user.

The task of execution server 5 is to unpack the confidential message, to check the authenticity of the user and his signature and to identify the mobile means of payment. Further, on the basis of the means of payment and the stored data the execution server 5 compiles all data needed for the balance management and sends it to balance manager 11, then returns the outcome of the balance manager's operation to persons involved in the transaction in a reliable manner.

Further component parts of the architecture for mobile paying according to the invention are: an integrated merchant interface 6, a mobile POS terminal, a UMG server 8 and a terminal server 9.

Integrated merchant interface 6 performs reservation, payment and set-off operation initiated by merchant 12 and receives the result of the operations.

Mobile POS terminal 7 performs payment operation initiated by the merchant 12, and receives the result of the operation. Mobile POS terminal may be a SIM-based mobile POS terminal 7a, in this case the application is executed on SIM. However it may be a non-SIM-based mobile POS terminal 7b, in this case the application is executed in the mobile device 1.

UMG server 8 (Universal Merchant Gateway) converts a payment transaction initiated by the user into merchant transaction and transmits the result of the conversion to merchant 12.

Terminal server 9 converts messages received from vending machines into reservation, payment and set-off operations, and returns the result of these operations to the vending machine. Naturally, this takes place only if vending machines are used.

In the process of providing the mobile means of payment the following steps are taken.

A precondition for registration of the mobile means of payment is that an instance of mobile application 2 is installed in mobile device 1. Further, mobile device 1 executing mobile application 2 should be recorded as a unique installation by the central safety server 4 and/or mobile communications server 3. Possession and use of mobile application 2 in combination with mobile device 1 executing the application is required for a valid transaction. During installation of mobile application 2 a secure environment is established between mobile device 1 and communications server 3 in which registration of mobile means of payment can take place in a safe manner.

During registration of the mobile means of payment all basic data associated with the means of payment must be given. In case of user registration this takes place through the application interface, in case of issuing a means of payment it is performed by a person responsible for balance manager 11 on the basis of the user's instruction. Safe handling and storing of the given data is ensured by a unique and safe method according to the invention. All recorded data are encrypted by using PKI technology before they are transmitted from mobile device 1 to communications server 3. Further, each data package encrypted in this manner is signed with a signature key required for safe communication.

Basic data of mobile means of payment are decrypted in execution server 5 by using its private key, and for verification of the signed imprint the public key corresponding to the signature key of the mobile application is required. A request for registering the mobile means of payment is transmitted from execution server 5 to balance manager 11 as a debit-entry so that the owner of the balance is able to obtain a one-time password validating the registration of the mobile means of payment by checking the data of the debit entry.

If registration debit authorization of the mobile means of payment is successful on the basis of the basic data of the mobile means of payment, then basic data of the mobile means of payment are encrypted by execution server 5, and the cryptogram obtained after encryption is divided into two parts. The first part of the cryptogram is sent back encrypted to mobile device 1 as registered but not yet valid (activated) mobile means of payment. Finally, these data are stored in the memory of mobile device 1. The other part of the cryptogram is stored at execution server 5 as the server side pair of the registered but not valid mobile means of payment.

The actual owner of the balance defined by the mobile means of payment enters the validating one-time password received in registration debit data of mobile means of payment into mobile application 2. Then mobile device 1 sends this password signed with the private key of the user and encrypted with the public key of the execution server to execution server 5 through safety server. If the validating password is correct, the server side pair of the mobile means of payment is validated by the execution server and it sends a validation message back to mobile device 1.

After that by means of the valid mobile means of payment transactions to be executed with balance manager 11 can be performed in such a manner that the basic data of mobile means of payment are not required to be given again. Only the valid means of payment must be selected and the mobile PIN must be entered in mobile device 1. Due to the architecture according to the invention, by means of the mobile means of payment and its server side pair, the execution server 5 is able to generate the basic data of mobile means of payment required for the transaction in such a manner that after accomplishment of the transaction the basic data of mobile means of payment are not stored and therefore they cannot be reconstructed. In this manner enhanced safety is ensured.

A transaction with the mobile means of payment goes as follows.

The user must have a valid mobile means of payment. A number of mobile means of payment can be registered in a mobile application 2. The type of the mobile means of payment determines which type of balance manager 11 can be used for performing the transaction.

A debit transaction can be initiated by merchant 12 through integrated merchant interface 6 from a mobile POS terminal 7 (either SIM based 7a or non-SIM based 7b), from terminal server 9 or can be initiated by a user from a UMG server 8. In each case, on initiation of a transaction merchant 12 determines which types of means of payment are accepted by him.

A notification about the initiation of the transaction is sent to the user then he selects a mobile means of payment in compliance with the type of means of payment acceptable by merchant 12.

By entering the mobile PIN the transaction is validated by communications server 3 and safety server 4, that is, the data of the transaction and the client side data of the mobile means of payment stored and selected according to the invention are signed and transmitted encrypted to execution server 5.

The data of the transaction and the selected mobile means of payment are decrypted at execution server 5 by using its private key in compliance with the method according to the invention. For verification of the signature of the transaction data the public pair of the signature key belonging to the user is also required. After matching the mobile means of payment and its server side pair according to the invention, the basic data of the mobile means of payment are generated and balance managing operation is executed by execution server 5.

Then execution server 5 sends a message containing the result of the transaction to the user and merchant 12.

In the following a few examples of balance manager subunits A, B, C and D present in a possible balance manager 11 belonging to a mobile means of payment will be given.

1. Handling balances belonging to bank cards:
The mobile means of payment may belong to a physically existing bank card issued by a commercial bank. In this case the value of the transaction paid with the mobile means of payment is entered by the bank to the debit side of the account belonging to the bank card.

2. Handling balances belonging to bank accounts:
For bank accounts kept at a commercial bank the bank may initiate issuing mobile means of payment. In this case it is not necessary for the user to have a physically existing bank card. A code is made available for the user by the bank with which he can activate the mobile means of payment generated by the bank. Every transaction paid with mobile means of payment is debited to the account linked to the mobile means of payment.

3. Handling balances administered by a merchant:
If merchant 12 has balances usable for accessing goods or services, services for issuing mobile means of payment can also be ensured to these balances. In this case the balance controlled by merchant 12 is behind the mobile means of payment activated in mobile device 1. Each payment made with this type of mobile means of payment will debit this balance.

4. Handling loyalty-type balances:
In case a merchant 12 rewards his customer with royalty points for purchase of goods and services which loyalty points can be used for paying subsequent purchase, mobile means of payment can be provided for loyalty balances, too. When the user pays for the goods or services with this type of mobile means of payment, his loyalty balance controlled by the merchant will be decreased.

FIG. 3 is a flowchart showing the steps of a method for generating a mobile means of payment MPI in the application system according to the invention. During the method:

in the mobile device 1:
 a) installing a mobile application 2,
 b) providing data of means of payment at the application interface,
 c) encrypting, signing and transmitting data of means of payment to execution server 5.

At the execution server 5:
 d) decrypting and checking data of means of payment,
 e) transmitting the registration request for means of payment to a balance manager 11.

At the balance manager 11:
 f) authorizing means of payment during which the validating password in the debit is also transmitted to balance manager 11.

Then at the execution server 5:
 g) encrypting data of means of payment and dividing the obtained cryptogram into two parts,
 h) transmitting the first part to the mobile device 1 and transmitting the second part to the execution server 5.

In the mobile device 1 of the user
 i) providing the validating password received in the debit report of the balance manager 11
 j) encrypting the validating password and signing if required.

At the execution server 5 checking and validating the password, and finally
 k) presenting the valid means of payment MPI at mobile device 1.

FIG. 4 is a flowchart showing the steps of a method for use of the mobile means of payment in the application system according to the invention. During the method a debit transaction is initiated at merchant 12 then:

on the mobile device 1 of the user the following steps are taken:
 a) selecting the mobile means of payment required for use in the transaction,
 b) entering the mobile PIN code belonging to the user c) through the safety server 4 signing the data with the private key of the user and encrypting them with the public key of the execution server 5 then transmitting them to execution server 5.

At the execution server 5:

d) decrypting data and checking the signature e) transmitting the transaction to be performed to the balance manager 11 of the application system.

At the balance manager 11:

f) managing the current transaction, g) reporting the result of the current transaction to the execution server 5.

The execution server 5 transmits the result of the current transaction to the merchant 12 and to the mobile device 1 of the user, finally:

h) presenting the result of the transaction to the merchant 12 and mobile device 1 of the user.

In a certain embodiment the system may comprise a vending machine 10 and a merchant terminal server 9 connected to it for converting messages from the vending machine into reservation, payment and set-off operations and for returning the result of the operation to the vending machine 10. The vending machine 10 is connected to the merchant terminal server 9 through a safe channel.

The invention claimed is:

1. Application system for mobile means of payment comprising mobile devices of registered users provided with applications and operated in a mobile network, a service provider, an account manager, a balance manager and a mobile POS terminal for executing a payment transaction initiated by a merchant and receiving a result of it, characterized in that said system further comprises:

a communications server programmed to generate a token for authorizing a transaction initiated by a user;

a safety server programmed to authenticate the user by signing an imprint with a unique private key of the user and using a PIN code of the user, when a message encrypted with a public key of the safety server containing the imprint generated from a data of a transaction initiated by the user on the mobile device is received;

an execution server programmed to:

during a registration of a mobile means of payment to be used for transactions by a mobile application installed on the mobile device, encrypt data of the mobile means of payment received from the mobile device to obtain a cryptogram; divide the cryptogram into a client side part and a server side part; transmit the client side part of the cryptogram to the mobile device and store the server side part of the cryptogram for use in subsequent processing of transactions using the mobile means of payment; and when processing the transaction initiated by the user, to receive the data of the transaction initiated by the user of the mobile device and the client side part of the cryptogram encrypted with the public key of the execution server and match the client side part of the cryptogram and server side part of the cryptogram to generate the data of the mobile means of payment; and transmit the data of the mobile means of payment to a balance manager to execute a transaction, as well as for transmitting the result of the balance manager's transaction in an authentic manner;

a Universal Merchant Gateway (UMG) server programmed to convert the payment transactions initiated by the user into service provider transaction and to transmit it to the service provider;

a mobile POS terminal;

a merchant terminal server programmed to convert the transaction initiated by the user into merchant transaction and to transmit it to the service provider;

wherein said safety server via said communications server, said communications server via said execution server and said UMG server, said execution server via an integrated merchant interface, said merchant terminal server and said UMG server are connected to said mobile POS terminal through a respective channel; and wherein said communications server, said safety server, said execution server, said UMG server, said mobile POS terminal, and said merchant terminal server comprises one or more processors.

2. System according to claim 1 characterized in that it comprises a vending machine and a merchant terminal server connected to the vending machine for converting messages from the vending machine into reservation, payment and set-off operations and for returning a result of the operation to the vending machine, the vending machine is connected to the merchant terminal server through a channel.

3. System according to claim 1 characterized in that the system comprises one or more balance manager programmed to handle balances belonging to bank cards and/or balances belonging to bank accounts and/or balances controlled by a merchant and/or loyalty-type balances.

4. System according to claim 1 characterized in that said mobile device is a mobile phone.

* * * * *